United States Patent Office 3,125,454
Patented Mar. 17, 1964

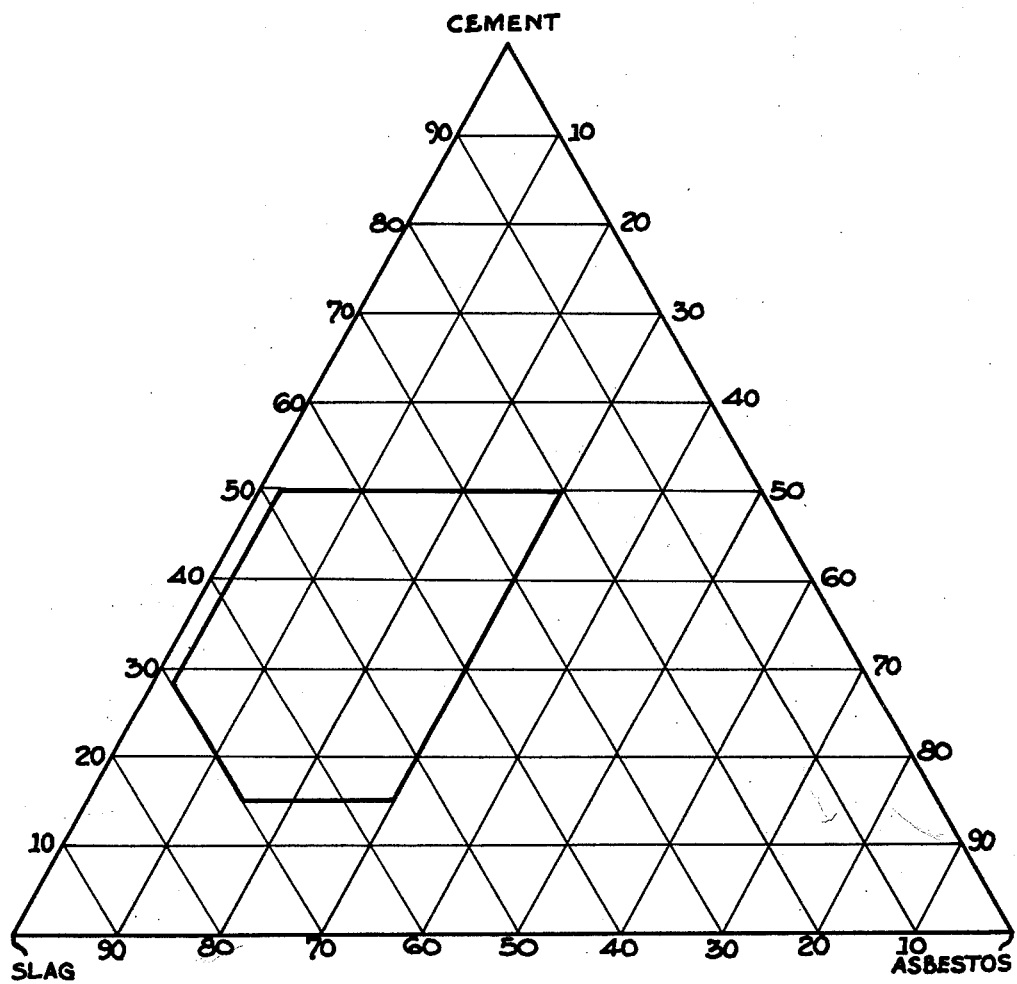

3,125,454
INSULATING COMPOSITIONS
James L. Dolph and Albert L. Renkey, both of Pittsburgh, Pa., assignors to Harbison-Walker Refractories Company, Pittsburgh, Pa., a corporation of Pennsylvania
Filed Nov. 3, 1961, Ser. No. 149,938
5 Claims. (Cl. 106—64)

This invention relates to refractory insulating compositions and in particular it concerns insulating compositions that are resistant to attack by molten non-ferrous metals.

In the aluminum, zinc, lead, tin and other non-ferrous metal industries, troughs are maintained for conveying the metals in the molten state. Usually these troughs are fabricated from iron or steel and then are lined with a refractory insulating material which shields the metal from heat, corrosion and chemical attack. In some of these industries, holding furnaces are used to retain molten metal at moderate temperatures up to about 2000° F. for various periods of time. Insulating compositions also are used to line these furnaces.

It is the primary object of the present invention to provide an insulating material which is resistant to the corrosion of molten non-ferrous metals and exhibits good strength and thermal insulating properties, yet is relatively inexpensive and can be prepared and applied with known techniques.

It has now been discovered that a refractory insulating material possessing the desired properties can be provided from mixes of calcium aluminate cement, blast furnace slag and asbestos. The resulting compositions are used by tempering with water to the desired consistency, the amount depending on the manner of application, and then the resulting products are installed. After drying, the resulting linings exhibit good strength and thermal insulating properties and yet are resistant to attack by molten aluminum, zinc, lead, tin and similar non-ferrous metals. Moreover, the compositions are such that less water need be used than has heretofore been required. Accordingly, in batch form they have greater homogeneity, and upon installation there is less shrinkage and greater strength in the resulting product than heretofore experienced.

Compositions within the present invention contain, by weight, about 15 to 50 percent of calcium aluminate cement, about 20 to 70 percent of blast furnace slag and about 2 to 30 percent of asbestos, the total being 100 percent and the percentages being based on the solids content of the mixture. This narrow range is illustrated in the attached graph showing these compositional limits. The preferred composition contains, by weight, 30 percent of the cement, 50 percent of the slag and 20 percent of asbestos.

The calcium aluminate cement for this invention preferably contains a high percentage of alumina and is substantially free of iron oxide and contains but a minimum amount of silica. It has been observed that the commercially available calcium aluminate cements that contain a high percentage of iron oxide to not exhibit the high strength of those cements containing fewer impurities. We have postulated that the decrease in strength is due to the decrease in cementitious phases present. This necessitates the use of a higher percentage of cement which leads to high shrinkage and can result in cracking and the like. Typical cements for the invention have an alumina content that exceeds the CaO, have an iron content up to about 2 percent and a silica content not over about 10 percent. Representative examples of cements that are satisfactory for use in the present invention have compositions as follows, in weight percent:

|  | Cement No. 1 | Cement No. 2 |
|---|---|---|
| CaO | 18.5 | 39.8 |
| $Al_2O_3$ | 79.3 | 50.8 |
| $Fe_2O_3$ | 0.3 | 1.3 |
| $SiO_2$ | 0.1 | 5.8 |
| Loss | 1.2 | 1.9 |

The blast furnace slag used in this invention is product of commerce known as expanded slag, and is essentially non-vitreous. As available and as used herein, it is of fine particle size and has a bulk density of about 127 pounds per cubic foot. A typical analysis, in weight percent, of blast furnace slag of this type is as follows:

| | Percent |
|---|---|
| Silica ($SiO_2$) | 33–42 |
| Alumina ($Al_2O_3$) | 10–16 |
| Lime (CaO) | 36–45 |
| Magnesia (MgO) | 3–12 |
| Other | Minor |

A typical screen analysis of the slag as used hereinafter is, in weight percent, as follows:

| | Percent |
|---|---|
| −3 +10 | 34 |
| −10 +28 | 28 |
| −28 +65 | 21 |
| −65 | 17 |

The asbestos that is used in this invention also is an article of commerce. It is preferred to use asbestos fibers known in the refractory arts as asbestos shorts. These are used as such in the invention as obtained from the manufacturer.

In forming compositions for use in this invention, the slag, cement and asbestos preferably are thoroughly dry mixed. Thereafter water is added in an amount to give the consistency best suited to the manner of application. The resulting products can be applied to the troughs, furnaces and the like for which they are used by trowelling, tamping, ramming or the like, or preformed shapes such as monolithic linings or even brick shapes can be prepared. Usually, however, the product will be applied on the site and thus is dry mixed, shipped to the point of application and there tempered and used.

The invention will be further described in conjunction with the following examples in which the details are given by way of illustration and not by way of limitation.

In these examples the cement, slag and asbestos were thoroughly dry mixed. Then water was added in an amount to provide tamping consistency. The mixes were hand tamped into brick shapes for testing. The test samples were allowed to set overnight and then were dried at 230° F. for 24 hours.

The data obtained are as follows:

made with cement No. 1, following the procedure outlined above. The composition, by weight, was 30 percent cement, 50 percent slag and 20 percent asbestos. A pocket about 1 inch deep and about 3 inches in diameter

*Table I*

|  | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Cement No. 2, percent | 10 | 10 | 20 | 20 | 30 | 30 | 40 | 40 | 50 | 40 | 30 | 35 | 38 | 40 |
| Expanded Slag, fine, percent | 85 | 70 | 70 | 60 | 60 | 50 | 55 | 40 | 20 |  | 50 | 60 | 60 | 60 |
| Asbestos Shorts, percent | 5 | 20 | 10 | 20 | 10 | 20 | 5 | 20 | 30 | 60 | 18 |  | 2 |  |
| Bentonite, percent |  |  |  |  |  |  |  |  |  |  | 2 | 5 |  |  |
| Water Added to Bring to Tamping Consistency, percent | 21 | 35 | 35 | 29 | 32 | 35 | 23 | 40 | 42 | 55 | 25 | 19 | 23 | 16 |
| Bulk Density, p.c.f. | 89 | 87 | 91 | 95 | 100 | 94 | 112 | 90 | 91 | 74 | 104 | 123 | 114 | 122 |
| Modulus of Rupture, p.s.i. | 110 | 170 | 330 | 510 | 420 | 610 | 851 | 520 | 700 | 250 | 900 | 1,010 | 750 | 980 |
| Cold Crushing Strength, p.s.i. | 420 | 780 | 1,030 | 1,810 | 1,410 | 1,950 | 3,980 | 2,150 | 3,000 |  | 5,000 | 6,180 | 5,090 | 8,300 |
| Aluminum Immersion Test | No penetration or reaction with any sample ||||||||||||||

The effect of molten aluminum on these mixes was determined by immersing specimens of the bricks about 2 x 2 x 2½ inches to about one-half their height in molten aluminum alloy for 72 hours at 1500° F. Aluminum alloy 7075, which contains 5.5 percent zinc, 2.5 percent magnesium, and 1.5 percent copper, was used in this test as this alloy has been observed to exhibit greater corrosiveness than aluminum metal alone. The specimens were then removed from the bath and cut in half to observe the penetration caused by the metal. This test simulates attack at the metal line where the attack is most severe. As pointed out in Table I, all of these compositions showed no penetration or reaction with this alloy.

From the data in the table it can be seen that where the cement content is as low as 10 percent the strength of the mixes is not sufficient to withstand the abrasive action and the stresses set up by the flowing molten metal. A modulus of rupture greater than 200 p.s.i. is considered necessary for this service. Therefore, the presence of about 15 pecent cement has been considered as a minimum. With the 50 percent cement, the moisture requirement becomes very high, thus leading to greater shrinkage and the corresponding danger of cracking due to this shrinkage.

The need for asbestos is evident in assuring a product of adequate plasticity and the desired insulating properties. A minor amount of a plasticizer such as clay can be substituted to lend plasticity to the mix, thereby lowering the moisture content required. However, the complete substitution of the asbestos by clay or the omission of asbestos without substitution of any other component cannot be tolerated as the insulating property of the batch is greatly reduced. These two aspects are illustrated in mixes 12 and 14.

Mix 10 describes a typical batch of calcium aluminate cement and asbestos which, as noted above, has been used commercially in lining troughs conveying non-ferrous metals. It will be observed that the moisture requirement is extremely high and the strength quite low. The hazard of shrinkage cracks and the low strength of this material led to the development to our invention.

We have found that minor amounts of other aggregates which are relatively inert to the action of molten non-ferrous metals may be substituted for part of the blast furnace slag. Such materials may include chrome ore, Haydite, calcined alumina, calcined bauxite, olivine, calcined fireclay, and calcined kyanite. Their use is generally restricted by their higher bulk density which reduces the insulating properties of the mix. Also, there is a strong likelihood that should a particle of a heavy aggregate be plucked out of the refractory mix by the molten metal, it would not float to the surface of the melt and be skimmed off, but would be carried along the bottom and form an inclusion in the finished body.

In further tests of the invention, brick samples were was cut into the 9 x 4½ inch face of the brick thus prepared. Molten lead was poured into one cup, molten tin into another, and molten zinc into a third and each was held at 1500° F. for 72 hours. None of these metals penetrated or reacted with the brick material, thereby illustrating the resistance to chemical attack by these metals possessed by the material of our invention.

From the foregoing discussion and data, it is evident that our invention provides products of good strength, good insulating properties and exceptional resistance to the chemical attack of non-ferrous metals. These outstanding results are achieved in a simple manner that can be practiced with skills presently available in the refractory arts.

Unless otherwise stated, all percentages given in this specification are by weight.

In accordance with the provisions of the patent statutes, we have explained the principle of our invention and have described what we now consider to represent its best embodiment. However, we desire to have it understood that, within the scope of the appended claims, the invention may be practiced otherwise than as specifically described.

We claim:

1. An insulating composition particularly resistant to attack by molten non-ferrous metals consisting essentially, by weight, of about 15 to 50 percent of calcium aluminate cement, about 20 to 70 percent of blast furnace slag, and about 2 to 30 percent of asbestos.

2. A refractory insulating product that is resistant to attack by molten non-ferrous metals comprising driedshapes formed from a tempered batch consisting essentially of about 15 to 50 percent of calcium aluminate cement, about 20 to 70 percent of blast furnace slag and about 2 to 30 percent of asbestos.

3. A product in accordance with claim 2 in which said cement is present in an amount of 30 percent, the slag is present in an amount of 50 percent and the remainder of the solids is asbestos.

4. An unconsolidated, dry, size graded refractory batch mixture capable of being tempered for fabrication of refractory insulating product particularly resistant to attack by molten non-ferrous metals and consisting essentially of, by weight, about 15 to 50% of calcium aluminate cement, about 20 to 70% of blast furnace slag, and about 2 to 30% of asbestos.

5. In the batch composition of claim 4, said calcium aluminate cement characterized by an $Al_2O_3$ content exceeding the CaO content, no more than 10% $SiO_2$ and no more than about 2% $Fe_2O_3$, all percentages by weight.

References Cited in the file of this patent

UNITED STATES PATENTS 2,235,008     Brownmiller _____ Mar. 18, 1941
2,880,100     Ulfstedt _____ Mar. 31, 1959